United States Patent
Cho (10) Patent No.: US 8,032,354 B2
(45) Date of Patent: Oct. 4, 2011

(54) METHOD AND SYSTEM FOR COMMUNICATING BETWEEN TWO INDEPENDENT SOFTWARE COMPONENTS OF A DEVICE

(75) Inventor: Yu-Fong Cho, Linkou Shiang (TW)

(73) Assignee: NVIDIA Corporation, Santa Clara, CA (US)

( * ) Notice: Subject to any disclaimer, the term of this patent is extended or adjusted under 35 U.S.C. 154(b) by 609 days.

(21) Appl. No.: 11/965,005

(22) Filed: Dec. 27, 2007

(65) Prior Publication Data

US 2009/0168794 A1    Jul. 2, 2009

(51) Int. Cl.
*G06F 9/455* (2006.01)

(52) U.S. Cl. ......................................................... 703/25

(58) Field of Classification Search ................... 703/25; 719/312, 313
See application file for complete search history.

(56) References Cited

U.S. PATENT DOCUMENTS

| | | | | |
|---|---|---|---|---|
| 4,692,861 | A * | 9/1987 | May ............................... | 718/106 |
| 5,805,825 | A * | 9/1998 | Danneels et al. ............. | 709/243 |
| 5,812,820 | A * | 9/1998 | Loram ............................ | 703/20 |
| 5,826,041 | A * | 10/1998 | Ogus ............................. | 709/234 |
| 5,864,710 | A * | 1/1999 | Sands et al. ..................... | 710/5 |
| 6,356,951 | B1 * | 3/2002 | Gentry, Jr. ..................... | 709/250 |
| 6,434,161 | B1 * | 8/2002 | Higbee et al. .................. | 370/413 |
| 6,438,619 | B1 * | 8/2002 | Coman .......................... | 719/319 |
| 6,886,166 | B2 * | 4/2005 | Harrison et al. .............. | 719/313 |
| 6,950,873 | B2 * | 9/2005 | Jain et al. ...................... | 709/228 |
| 2006/0245533 | A1 * | 11/2006 | Rostampour ................. | 375/377 |
| 2007/0130399 | A1 * | 6/2007 | Anderson et al. ............... | 710/62 |

* cited by examiner

*Primary Examiner* — Dwin M Craig
(74) *Attorney, Agent, or Firm* — Patterson & Sheridan, LLP (57) ABSTRACT

A method and system for communicating between two independent software components of the WINDOWS® SIDESHOW™ device are disclosed. Specifically, one embodiment of the present invention sets forth a method, which includes the steps of independently queuing an incoming packet from a second software component via an emulated serial transport in a first software component before parsing and responding to the incoming packet and independently queuing an outgoing packet in the first software component before transmitting the outgoing packet to the second software component also via the emulated serial transport.

20 Claims, 6 Drawing Sheets

Fig. 6

METHOD AND SYSTEM FOR COMMUNICATING BETWEEN TWO INDEPENDENT SOFTWARE COMPONENTS OF A DEVICE

BACKGROUND OF THE INVENTION

1. Field of the Invention

The present invention relates to WINDOWS® SIDESHOW™ technology, and more particularly, to a method and system for communicating between two independent software components of a SIDESHOW™ device.

2. Description of the Related Art

Unless otherwise indicated herein, the approaches described in this section are not prior art to the claims in this application and are not admitted to be prior art by inclusion in this section.

Windows® Vista® is a commercially available operating system from Microsoft Corporation of Redmond, Wash., hereinafter referred to as WINDOWS VISTA. Windows® SideShow™ is a commercially available application program from Microsoft Corporation of Redmond, Wash., hereinafter referred to as WINDOWS SIDESHOW. With WINDOWS VISTA operating systems becoming the dominant operating systems for personal computers, a variety of software or hardware applications compatible with Vista-based computer systems are also becoming more and more popular. One of the Vista-based software/hardware applications WINDOWS SIDESHOW, which is a technology that supports an auxiliary screen to the Vista-based computer system.

Figure 1:
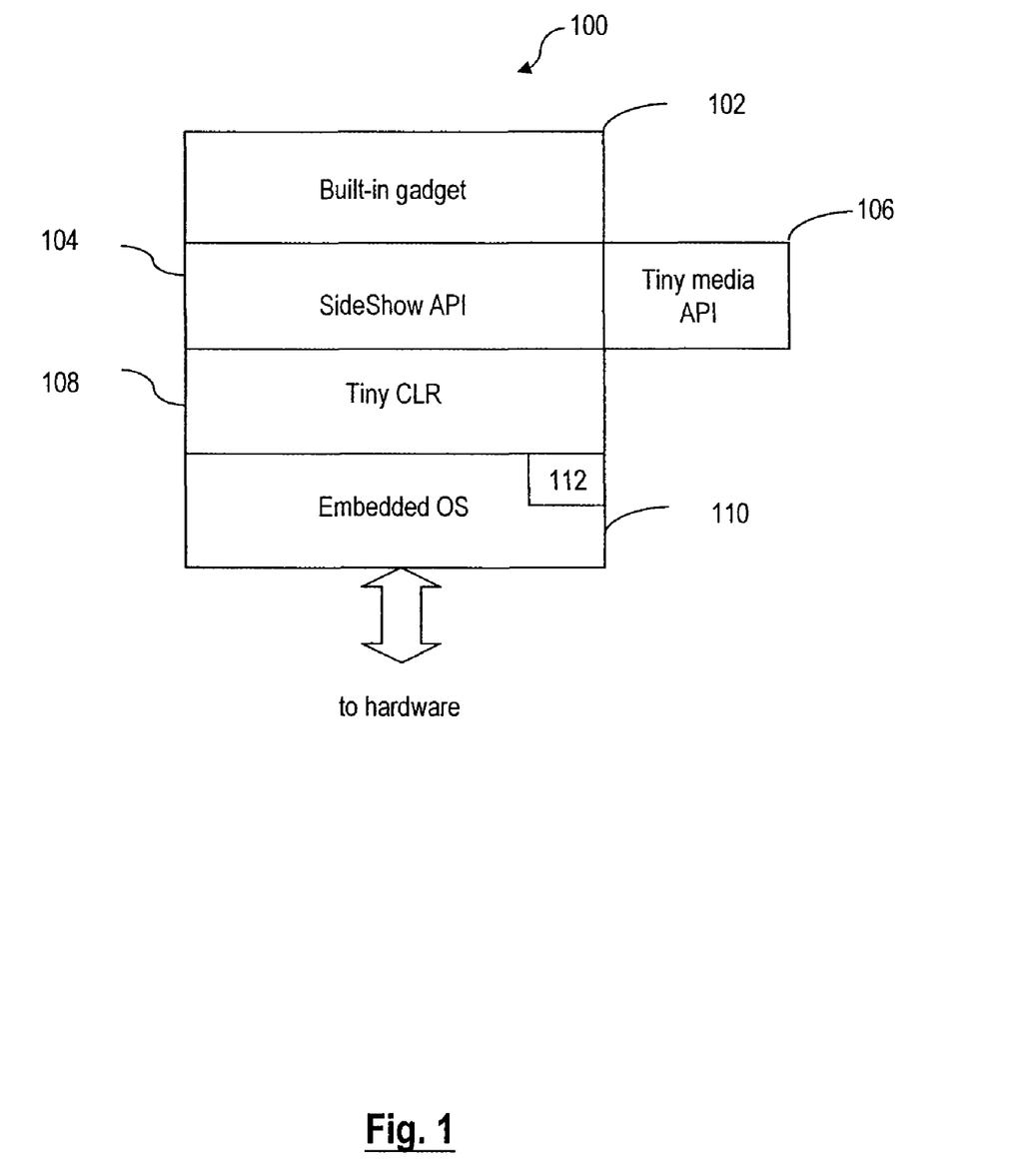
FIG. 1 is a simplified block diagram showing a software stack for a WINDOWS SIDESHOW device.

To illustrate, FIG. 1 is a simplified block diagram showing a software stack 100 for a WINDOWS SIDESHOW device. The software stack 100 includes a built-in gadget 102, a SIDESHOW Application Programming Interface (API) 104, a tiny media API 106, a tiny Common Language Runtime (CLR) 108, and an embedded operating system (OS) 110. Here, two distinct software components, such as the built-in gadget 102 and the embedded OS 110, communicate with each other via emulated serial transports such as virtual Universal Asynchronous Receiver Transmitter (UART) ports. Unlike their physical counterparts that directly access the hardware of the WINDOWS SIDESHOW device, these virtual UART ports are created to emulate the characteristics of the physical UART ports and to facilitate the communication between two software components. Specifically, for the built-in gadget 102 to access the hardware of the WINDOWS SIDESHOW device, the built-in gadget 102 may invoke function calls supported by the tiny media API 106, wherein the function calls further depend on routines that are supported by the tiny CLR 108. To abstract some of the operation details of the software stack 100 from the built-in gadget 102, some of the data or commands from the built-in gadget 102 are encapsulated and sent through virtual UART ports 112, so that the data or commands can be further operated on by the embedded OS 110.

However, there currently lacks a method or system to ensure the robustness of the communication between the aforementioned two independent software components through the emulated serial transports. More particularly, conventional methods or systems neither guarantee the success of the transfer of packets from one software component to another nor enable the software component that sends the packets to efficiently acquire the status of such transfer.

What is needed in the art is thus a method and system that enable two independent software components of the WINDOWS SIDESHOW device to communicate robustly and efficiently and address at least the problems set forth above.

SUMMARY OF THE INVENTION

A method and system for communicating between two independent software components of the WINDOWS SIDESHOW device are disclosed. Specifically, one embodiment of the present invention sets forth a method, which includes the steps of independently queuing an incoming packet from a second software component via an emulated serial transport in a first software component before parsing and responding to the incoming packet and independently queuing an outgoing packet in the first software component before transmitting the outgoing packet to the second software component also via the emulated serial transport.

At least one advantage of the present invention disclosed herein is to further improve the robustness of the communications between two independent software components in a WINDOWS SIDESHOW device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

Throughout this description, a computer system may include a main system and an auxiliary system. The main system typically is configured with a feature-rich operating system, such as WINDOWS VISTA, and much computing resources, such as central processing units (CPUs) and memory systems. The auxiliary system, on the other hand, is typically configured with embedded software programs and limited hardware resources. A "primary display" broadly refers to the display mainly driven by the main system, and an "auxiliary display" broadly refers to the display that can be driven by either the main system or the auxiliary system. Here, an example of the main system is a laptop computer, and an example of the auxiliary system is a WINDOWS SIDESHOW device coupled to the laptop computer.

Figure 2:
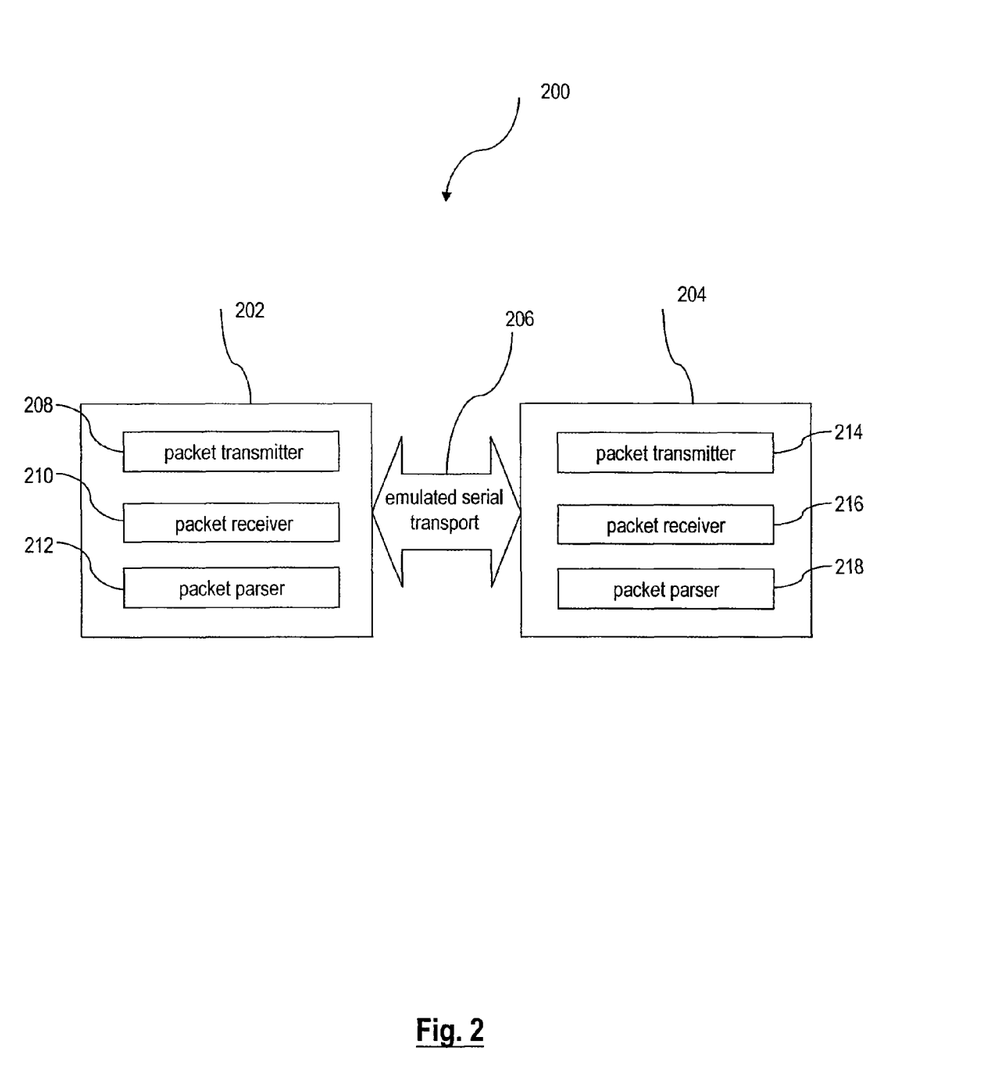
FIG. 2 is a simplified block diagram illustrating a communication session between two a first software component and a second software component of a WINDOWS SIDESHOW device, according to one embodiment of the present invention.

FIG. 2 is a simplified block diagram illustrating a communication session 200 between two a first software component 202 and a second software component 204 of a WINDOWS SIDESHOW device, according to one embodiment of the present invention. The two software components communicate with each other through an emulated serial transport 206. The first software component 202 includes a first packet transmitter 208, a first packet receiver 210, and a first packet parser 212. The second software component 204 includes a second packet transmitter 214, a second packet receiver 216, and a second packet parser 218.

Outgoing packets of the first software component 202, whether containing commands, results of executions, or status information, are transferred by the first packet transmitter 208 to the second packet receiver 216 through the emulated serial transport 206. Once received by the second packet receiver 216, such outgoing packets are viewed as incoming packets from the perspective of the second software component 204. If the packets are successfully received, the second packet receiver 216 returns an acknowledgment signal indicative of the success to the first software component 202 through the emulated serial transport 206. If the packets are not successfully received, the second packet receiver 216 returns a non-acknowledgment signal indicative of the failure also back to the first software component 202. After successfully receiving the packets, the second packet receiver 216 sends the received packets to a receive queue (not shown), from which the second packet parser 218 retrieves the packets and looks into the content of the packets. If the packets received are command packets, the parsed commands will be executed, and the results of the executions are sent to the second packet transmitter 214. In one implementation, the second packet parser 218 generates the packets that contain the results and are sent. If the received packets are not command packets, such as packets containing responses or status information, no commands are executed. Instead, some application programs (not shown) may be notified of the responses or status information.

Similarly, the second packet transmitter 214 also transmits packets to the first packet receiver 210 through the emulated serial transport 204. After having successfully received the packets, the first packet receiver 210 returns an acknowledgement signal to the second software component 204. On the other hand, if the packets are not received successfully, the first packet receiver 210 returns a non-acknowledgment signal back to the second software component 204. The first packet receiver 210 then sends the packets to the receive queue, from which the first packet parser 212 retrieves the packets and looks into the content of the packets to decide whether to execute commands or to notify the first software component 202 of some execution results.

Figure 3:
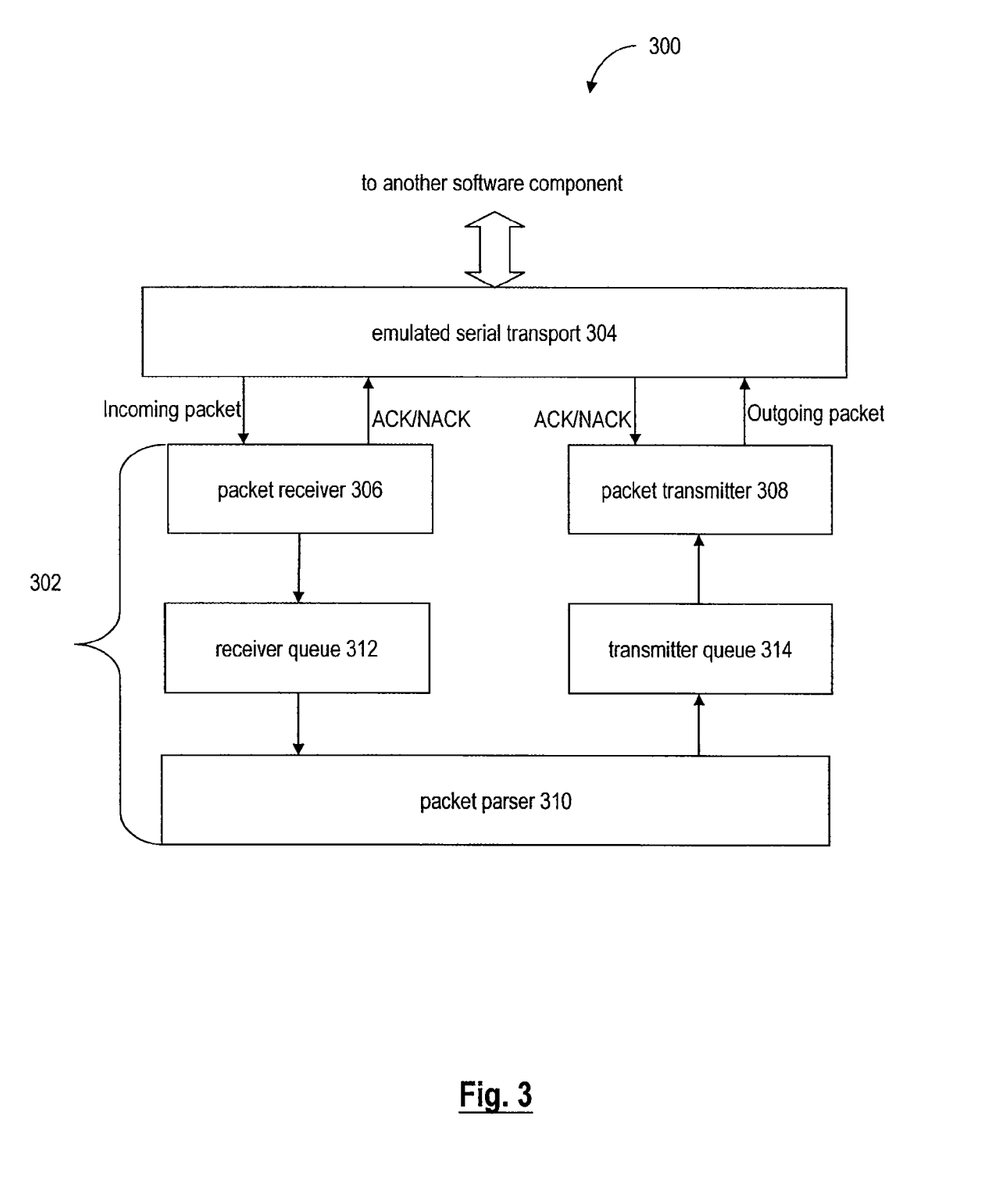
FIG. 3 is a block diagram detailing the data flow within one of the software components of FIG. 2, according to one embodiment of the present invention.

FIG. 3 is a block diagram detailing the data flow within one of the software components of FIG. 2, according to one embodiment of the present invention. In this communication session 300, a software component 302 communicates with another software component via the emulated serial transport 304. The software component 302 may correspond to the first software component 202 of FIG. 1, and the other software component may correspond to the second software component 204. In addition to a packet receiver 306, a packet transmitter 308, and a packet parser 310, the software component 302 further includes sub-components such as a receiver queue 312 and a transmitter queue 314. Regarding the receiving path, if the packet receiver 306 successfully receives an incoming packet, it puts the incoming packet in the receiver queue 312 and sends back a positive acknowledgment signal. Otherwise, the packet receiver 306 responds with a negative non-acknowledgement signal indicative of a failure. The packet parser 310 independently retrieves the incoming packet from the receiver queue 312 and determines the packet types by looking into the content of the incoming packet. If the receiver queue 312 is full when the packet receiver 306 receives the incoming packet, then the newly received incoming packet is not placed into the receiver queue 312 until the packet parser 310 pulls another incoming packet off the receiver queue 312. Regarding the sending path, the packet transmitter 308 retrieves an outgoing packet from the transmitter queue 314 to send to the emulated serial transport 304. The packet transmitter 308 learns of the transmission status via the received acknowledgement or non-acknowledgement signals.

In one implementation, the packet parser 310 generally recognizes two types of packets, a command packet and a response packet. A command packet contains a particular command intended to be executed, and a response packet contains results of executing a command. In one implementation, the response packet may also include error information associated with a failed operation. To illustrate, suppose an incoming packet is a command packet. After the packet parser 310 parses the packet, an application program corresponding to the command executes the command and places the execution results in a response packet to be sent back to the software component from which the command packet comes. This response packet to be transferred is first placed in the transmitter queue 314, which the packet transmitter 308 subsequently accesses. It should be noted that not all command packets require the recipient to respond with a response packet.

On the other hand, suppose the command is not executed properly. An error response packet is generated containing information associated with the failed execution and is placed in the transmitted queue 314 to be sent out. In another situation, suppose the packet transmitter 308 sends out an outgoing packet and receives a predetermined number of non-acknowledgement notifications over a predetermined amount of time. Here, the packet transmitter 308 also generates an error response packet with information indicative of this detected error condition and actually places this error response packet in the receiver queue 312 of the same software component 302. Subsequent paragraphs further detail the interactions among the various sub-components within the software component 302.

Figure 4:
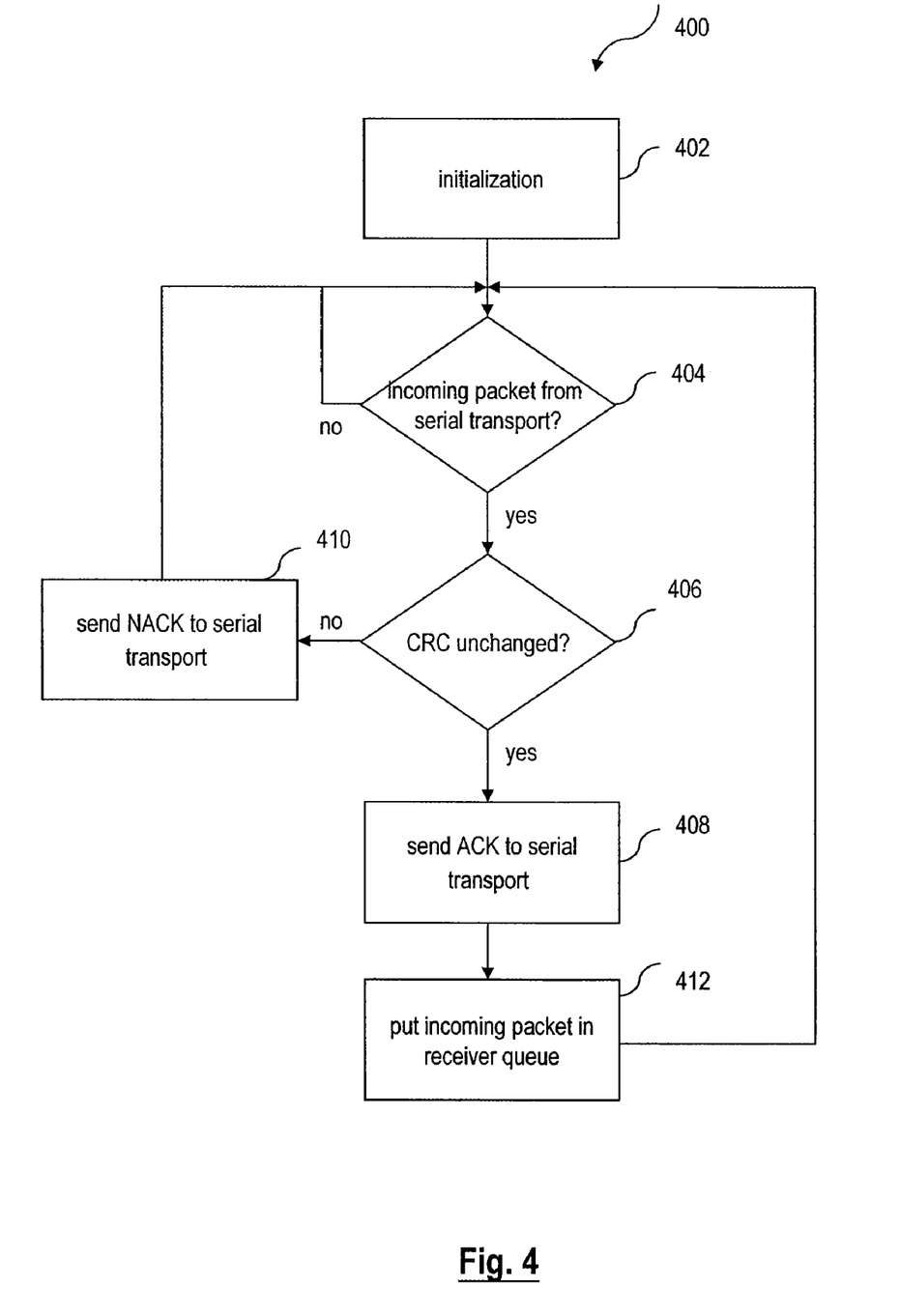
FIG. 4 is a flow chart illustrating a process followed by a packet receiver shown in FIG. 3, according to one embodiment of the present invention.

FIG. 4 is a flow chart illustrating a process 400 followed by the packet receiver 306 shown in FIG. 3, according to one embodiment of the present invention. In conjunction with FIG. 3, after initialization in step 402, the packet receiver 306 determines if there is any incoming packet from the emulated serial transport 304 in step 404. If so, then the packet received 306 in step 406 proceeds to determine whether cyclic redundancy check (CRC) in the header of the incoming packet changes or not. On the other hand, if there is no incoming packet from the emulated serial transport 304 yet, then the packet receiver 306 continues to look for the next incoming packet. If the CRC of the incoming packet remains intact, then an acknowledgment signal (ACK) is sent back in step 408 to the emulated serial transport 304 to notify the software component from which the incoming packet comes of the successful receipt of the incoming packet. Otherwise, a non-acknowledgment signal (NACK) is returned to that software component in step 410. After having successfully received the incoming packet, the packet receiver 306 places the received incoming packet in the receiver queue 312 in step 412 to be picked up by the packet parser 310. In one implementation, the emulated serial transport 304 is a virtual UART.

Figure 5:
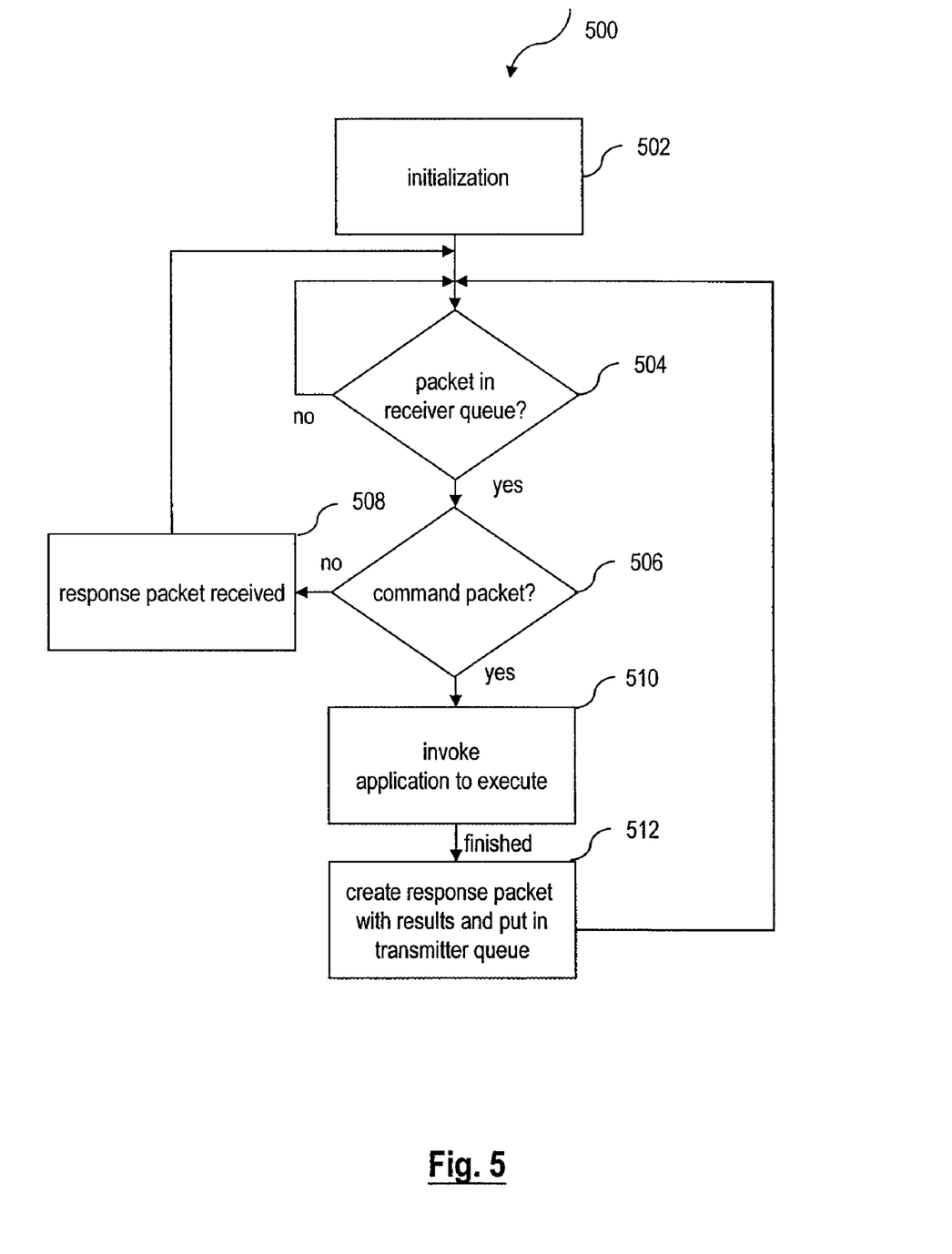
FIG. 5 is a flow chart illustrating a process followed by a packet parser of FIG. 3, according to one embodiment of the present invention.

FIG. 5 is a flow chart illustrating a process 500 followed by the packet parser 310 of FIG. 3, according to one embodiment of the present invention. After initialization in step 502, the packet parser 310 continues to check if there is any incoming packet in the receiver queue 312 in step 504. If there is an incoming packet in the queue, then the packet parser 310 determines the packet type. In one implementation, the packet parser 310 determines whether the incoming packet is a command packet in step 506. If not, then the packet parse 310 deems the incoming packet to be a response packet or an error response packet in step 508. As discussed above, the response packet may contain the results of the carrying out the parsed command, and the results are mainly used to notify the corresponding application that executes the command. The error response packet may contain information indicative of the failure of executing a received command or information indicative of the failure of sending out an outgoing packet.

On the other hand, if the packet in the receiver queue 312 is the command packet, then the packet parser 310 invokes the application program corresponding to the command to execute it in step 510. The application program, in one implementation, is external to the software component 302 and even the software component communicating with the software component 302. It should also be noted that the packet parser 310 continues to check if there is another packet in the receiver queue 312 during the execution of the command. After such execution is done, the packet parser 310 generates a response packet including the results of the execution and puts the response packet in the transmitter queue 314 in step 512. It is worth noting the steps of generating the response packets and the command packets are of higher priory than any other steps of the illustrated process 500. In other words, generating the response packets and the command packets is attended to by the packet parser 310 first, even if the packet parser 310 is still in the process of invoking an application program to execute the command, determining the packet type, or checking if there is any packet in the receiver queue 312.

Figure 6:
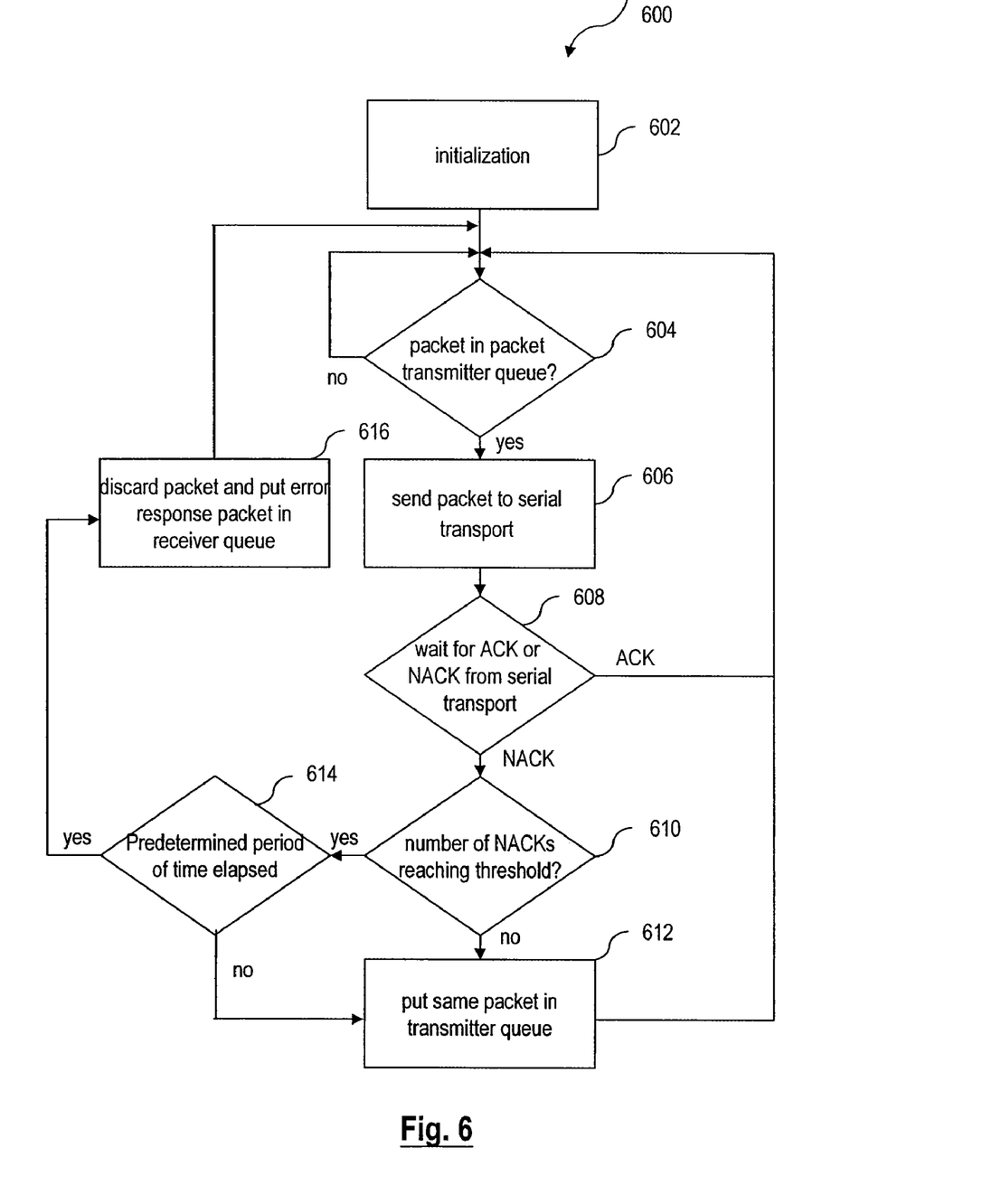
FIG. 6 is a flow chart illustrating a process followed by a packet transmitter of FIG. 3, according to one embodiment of the present invention.

FIG. 6 is a flow chart illustrating a process 600 performed by the packet transmitter 308 of FIG. 3, according to one embodiment of the present invention. After initialization in step 602, the packet transmitter 308 checks whether there is any packet in the transmitter queue 314 in step 604. If there is no packet, then the packet transmitter 308 continues to check. If there is a packet in the transmitter queue 314, the packet transmitter 308 sends the packet to the emulated serial transport 304 in step 606. After sending out the outgoing packet, the packet transmitter 308 awaits ACK or NACK from the emulated serial transport 308 in step 608. If the emulated serial transport 304 relays an ACK, the packet transmitter 308 goes back to step 604 to continue processing other packets in the transmitter queue 314. If the emulated serial transport 304 instead relays a NACK, the packet transmitter 308 counts how many times a NACK has been received and checks whether the counted number of times reaches a predetermined threshold in step 610. If the threshold is not reached, then the same outgoing packet is placed in the transmitter queue 314 in step 612 so that the outgoing packet can be sent out again. If instead the predetermined threshold is reached and no ACK is received over a predetermined period of time in step 614, the packet transmitter 308 then discards this outgoing packet and puts an error response packet in the receiver queue 306 of the same software component 302 in step 616. In one implementation, the threshold for the number of NACKs is three.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

I claim:

1. A method for communicating between two software components of an auxiliary device, the method comprises:
   receiving, by a first software component, an incoming packet from a second software component via an emulated serial transport, wherein the emulated serial transport emulates characteristics of physical Universal Asynchronous Receiver Transmitter (UART) ports configured for communication between a main system running a feature-rich operating system and an auxiliary system having limited hardware resources compared with the main system;
   queuing the incoming packet in a receiver queue;
   independently retrieving the incoming packet from the receiver queue before parsing the incoming packet; and
   independently queuing an outgoing packet in the first software component before transmitting the outgoing packet to the second software component also via the emulated serial transport, wherein the first software component and the second software component reside within the auxiliary system.

2. The method of claim 1, further comprising verifying that a cyclic redundancy check (CRC) in a header of the incoming packet remains intact before queuing the incoming packet.

3. The method of claim 2, further comprising sending an acknowledgment signal indicative of the intactness of the CRC to the second software component.

4. The method of claim 2, further comprising:
   receiving, by the first software component, a second incoming packet from the second software component via the emulated serial transport;
   verifying that a cyclic redundancy check (CRC) in a header of the second incoming packet does not remain intact; and
   sending a non-acknowledgement signal indicative of a change in the CRC to the second software component.

5. The method of claim 1, further comprising invoking an application program external to the two software components to execute a command extracted from the incoming packet.

6. The method of claim 5, wherein the second packet contains results from executing the command.

7. The method of claim 1, further comprising queuing a response packet containing status information, wherein the status information is established by comparing a number of non-acknowledgement signal occurrences associated with transmitting the outgoing packet to a predetermined threshold.

8. The method of claim 1 further comprising queuing a response packet containing status information, wherein the status information is established by determining that an acknowledgement signal associated with transmitting the outgoing packet occurs within a predetermined amount of time.

9. A non-transitory computer-readable storage medium containing a sequence of instructions executable within an auxiliary device including a processing unit and a memory system, wherein the sequence of instructions, when executed by the processing unit, causes the processing unit to:
  receive, by a first software component, an incoming packet from a second software component via an emulated serial transport, wherein the emulated serial transport emulates characteristics of physical Universal Asynchronous Receiver Transmitter (UART) ports configured for communication between a main system running a feature-rich operating system and an auxiliary system having limited hardware resources compared with the main system;
  queue the incoming packet in a receiver queue;
  independently retrieve the incoming packet the incoming packet; and
  independently queue an outgoing packet in the first software component before transmitting the outgoing packet to the second software component also via the emulated serial transport, wherein the first software component and the second software component reside within the auxiliary system.

10. The computer-readable medium of claim 9, further containing a sequence of instructions, which when executed by the processing unit in the auxiliary device, causes the processing unit to verify that a cyclic redundancy check (CRC) in a header of the incoming packet remains intact before queuing the incoming packet.

11. The computer-readable medium of claim 10, further containing a sequence of instructions, which when executed by the processing unit in the auxiliary device, causes the processing unit to send an acknowledgment signal indicative of the intactness of the CRC to the second software component.

12. The computer-readable medium of claim 10, further containing a sequence of instructions, which when executed by the processing unit in the auxiliary device, causes the processing unit to:
  receive, by the first software component, a second incoming packet from the second software component via the emulated serial transport;
  verify that a cyclic redundancy check (CRC) in a header of the second incoming packet does not remain intact; and
  send a non-acknowledgement signal indicative of a change in the CRC to the second software component.

13. The computer-readable medium of claim 9, further containing a sequence of instructions, which when executed by the processing unit in the auxiliary device, causes the processing unit to invoke an application program external to the first software component and the second software component to execute a command extracted from the incoming packet.

14. The computer-readable medium of claim 9, wherein the second packet contains results from executing the command.

15. The computer-readable medium of claim 9, further containing a sequence of instructions, which when executed by the processing unit in the auxiliary device, causes the processing unit to queue a response packet containing status information, wherein the status information is established by comparing a number of non-acknowledgement signal occurrences associated with transmitting the outgoing packet to a predetermined threshold.

16. The computer-readable medium of claim 9 further comprising queuing a response packet containing status information, wherein the status information is established by determining that an acknowledgement signal associated with transmitting the outgoing packet occurs within a predetermined amount of time.

17. A system comprising:
  a main computing system running a feature-rich operating system and coupled to an auxiliary device having limited hardware resources compared with the main system through physical Universal Asynchronous Receiver Transmitter (UART) ports configured for communication between the main computing system and the auxiliary device; and
  the auxiliary device including a memory that stores a first software component configured to communicate with a second software component via an emulated serial transport that emulates characteristics of the physical UART ports configured for communication between the main system and the auxiliary device, comprising:
    the first software component having a packet transmitter, a packet receiver, a transmitter queue, a receiver queue, and a packet parser, wherein
      an incoming packet from the second software component is received via the emulated serial transport by the first software component,
      placed in the receiver queue, and
      independently retrieved from the receiver queue before the packet parser operates on the incoming packet; and
      an outgoing packet is independently placed in the transmitter queue before the packet transmitter operates on the outgoing packet.

18. The auxiliary device of claim 17, wherein the packet receiver further verifies that a cyclic redundancy check (CRC) in a header of the incoming packet remains intact before placing the incoming packet in the receiver queue.

19. The auxiliary device of claim 17, wherein the packet transmitter further queues a response packet containing status information, wherein the status information is established by comparing a number of non-acknowledgement signal occurrences associated with transmitting the outgoing packet to a predetermined threshold.

20. The auxiliary device of claim 17 further comprising queuing a response packet containing status information, wherein the packet transmitter further determines that an acknowledgement signal associated with transmitting the outgoing packet occurs within a predetermined amount of time to establish the status information and potentially places the response packet in the receiver queue of the first software component.

* * * * *